Jan. 5, 1965   D. L. ENSLEY   3,164,022
ACOUSTICALLY SUPPORTED MOTION SENSOR AND METHOD
Filed May 29, 1961   5 Sheets-Sheet 1
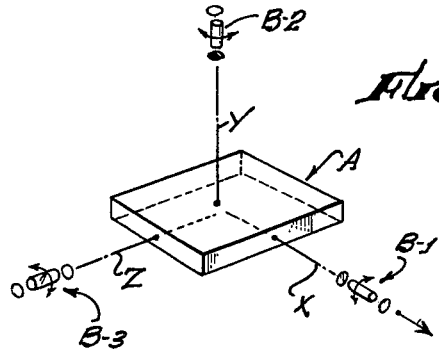
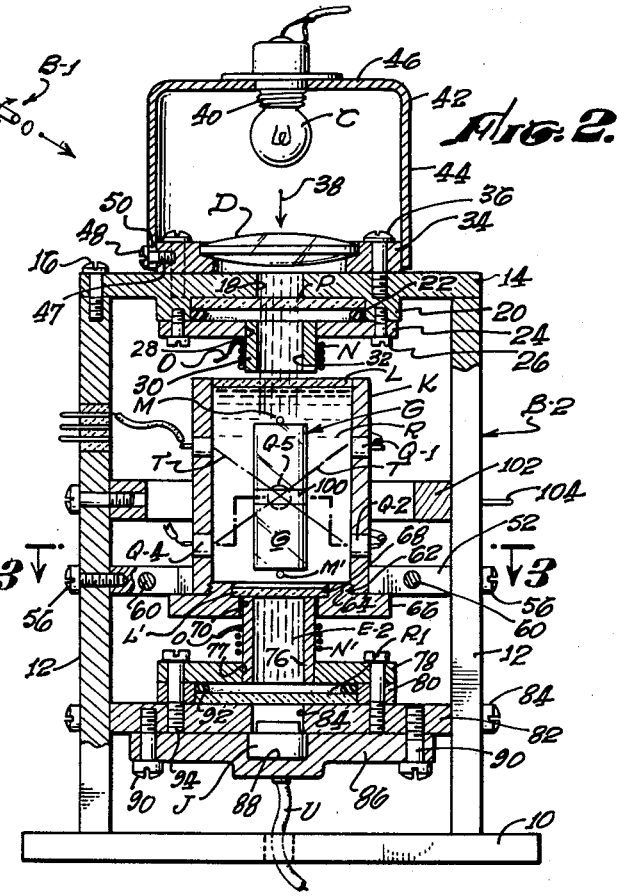
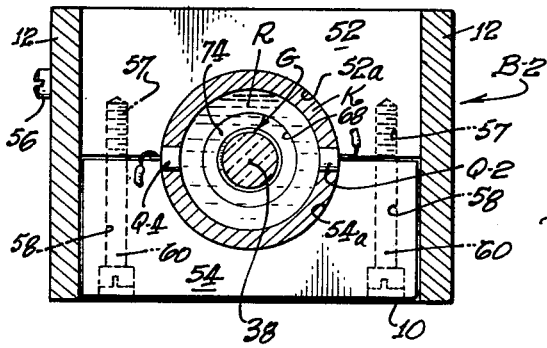
DONALD LUTHER ENSLEY,
INVENTOR.
BY
William C. Babcock
ATTORNEY.

Jan. 5, 1965    D. L. ENSLEY    3,164,022
ACOUSTICALLY SUPPORTED MOTION SENSOR AND METHOD
Filed May 29, 1961    5 Sheets-Sheet 2
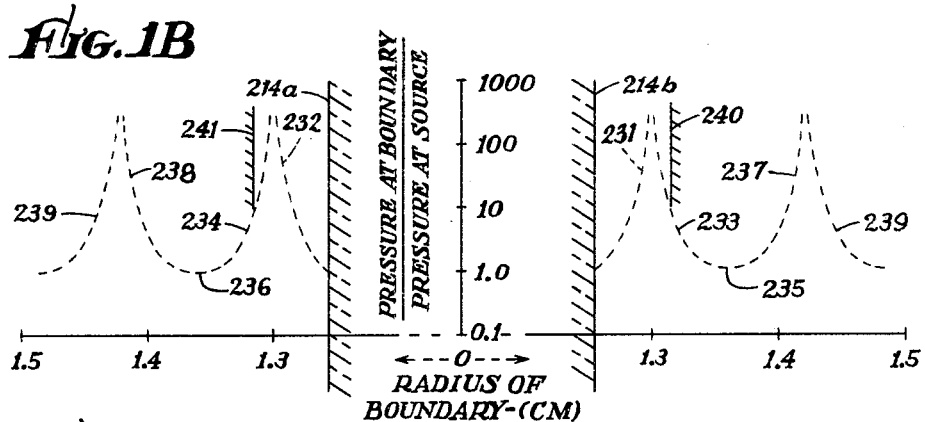
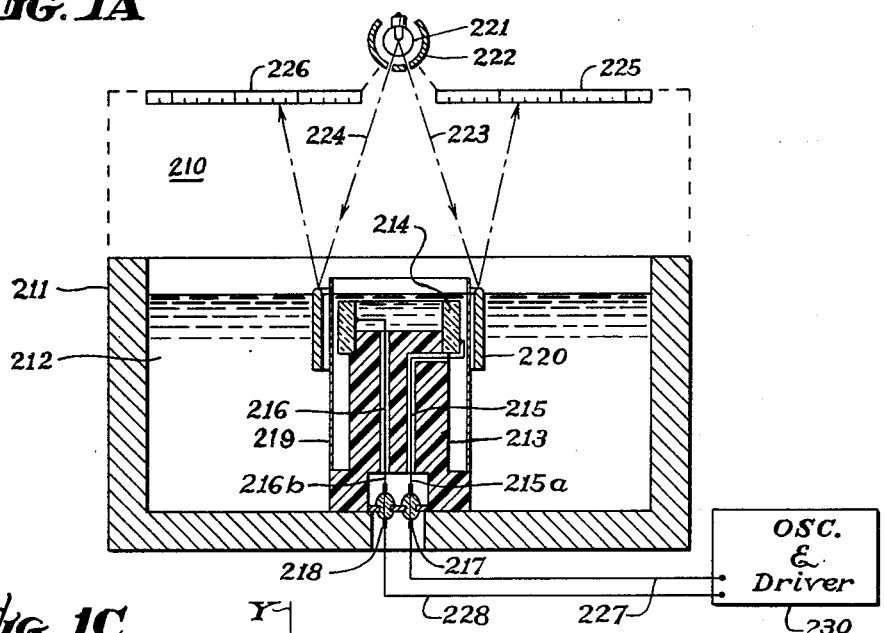
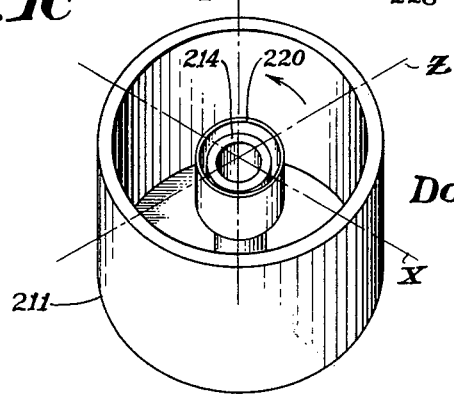
DONALD LUTHER ENSLEY,
INVENTOR.
BY D. Care Richards
ATTORNEY

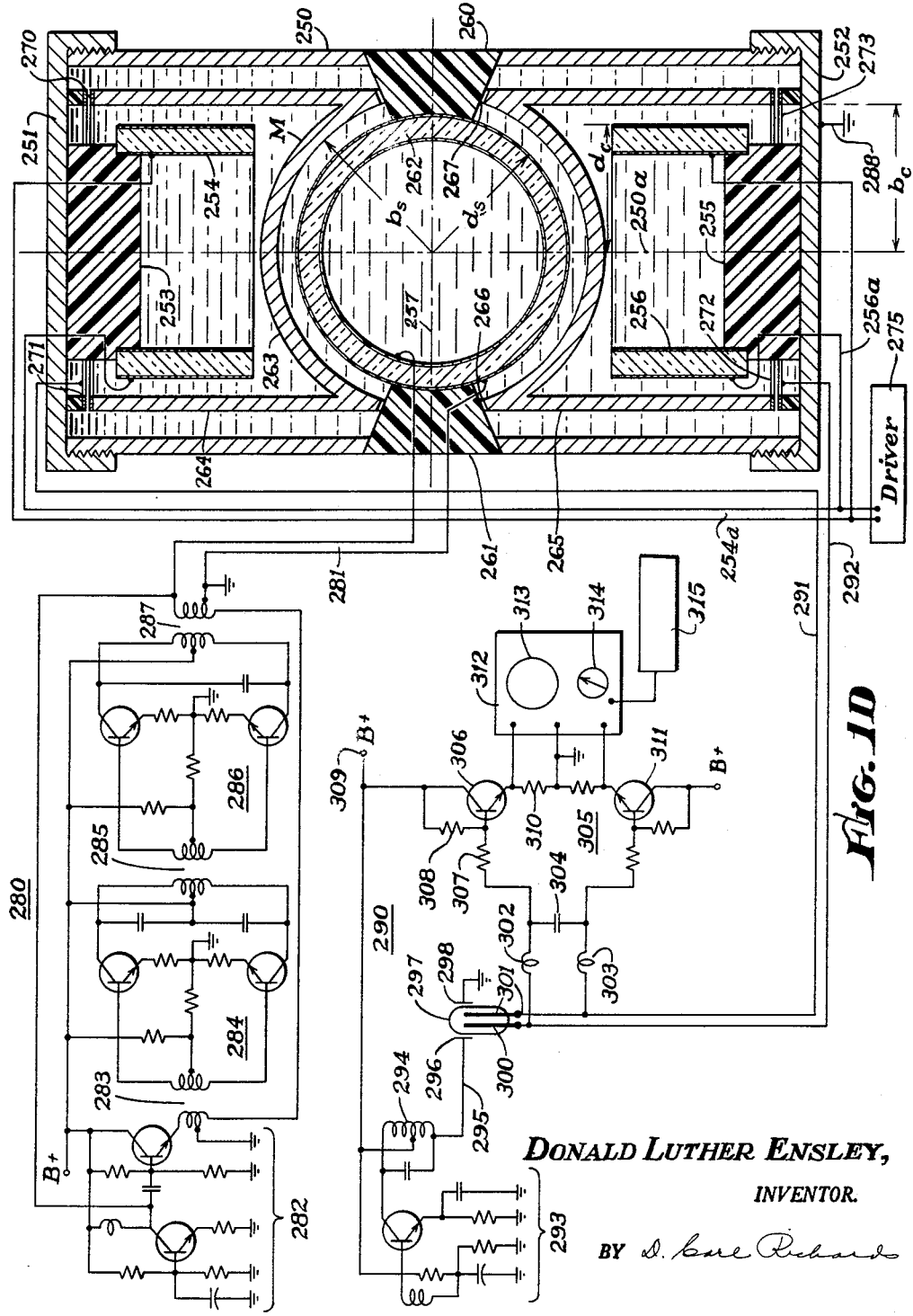

Jan. 5, 1965  D. L. ENSLEY  3,164,022
ACOUSTICALLY SUPPORTED MOTION SENSOR AND METHOD
Filed May 29, 1961  5 Sheets-Sheet 4
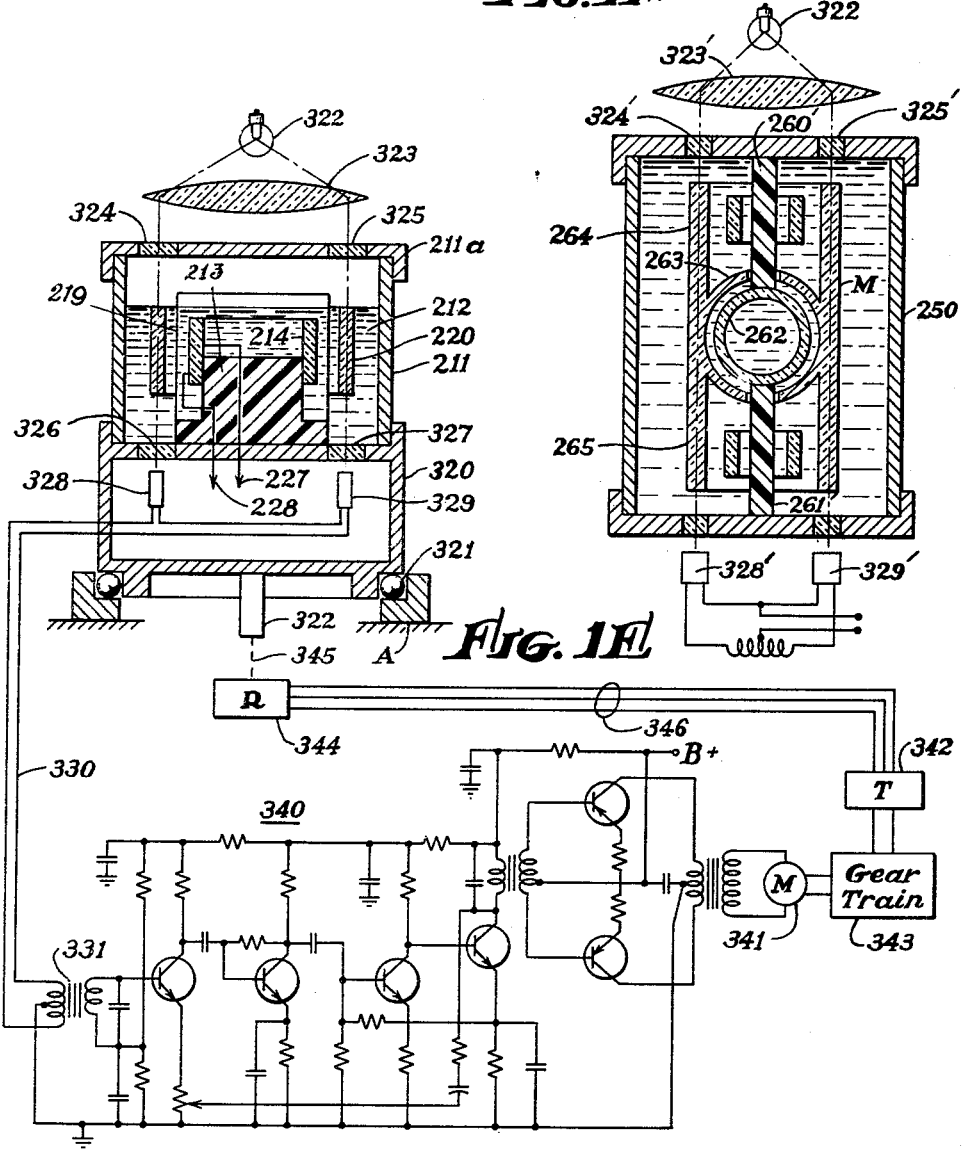
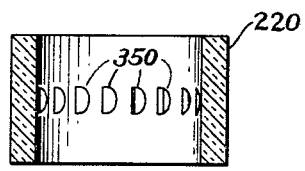
DONALD LUTHER ENSLEY,
INVENTOR.
BY D. Carl Richards
ATTORNEY Jan. 5, 1965     D. L. ENSLEY     3,164,022
ACOUSTICALLY SUPPORTED MOTION SENSOR AND METHOD
Filed May 29, 1961     5 Sheets-Sheet 5
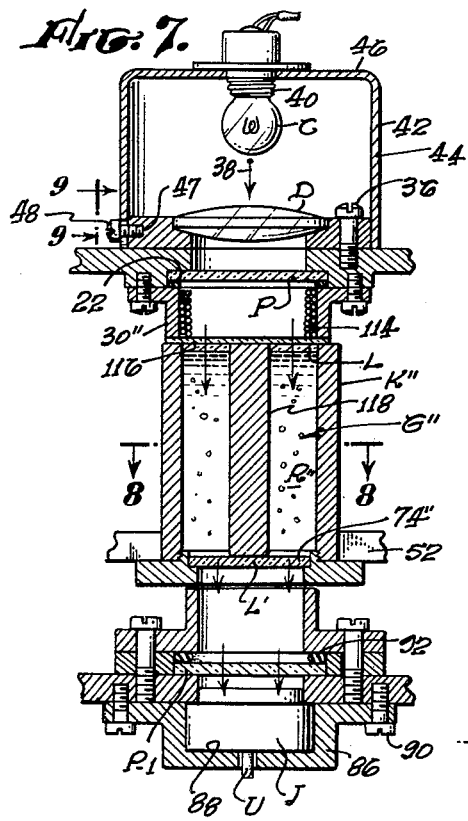
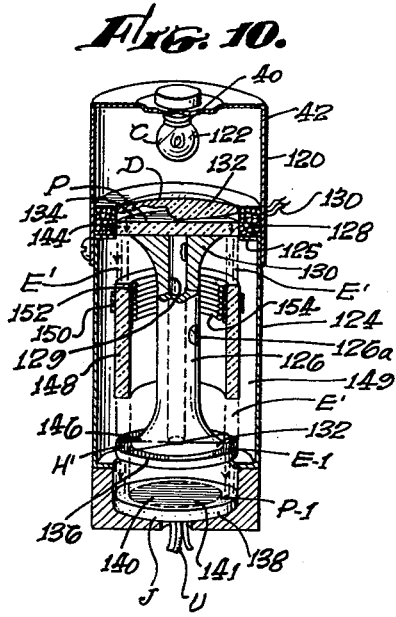
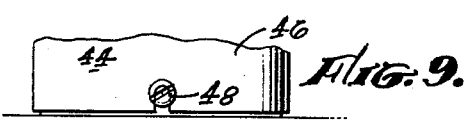
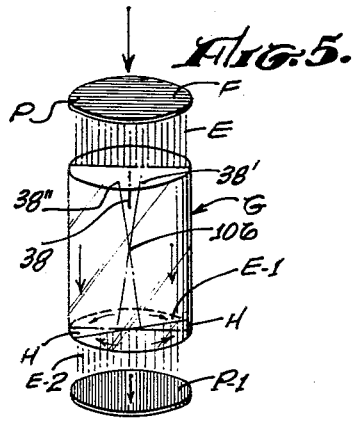
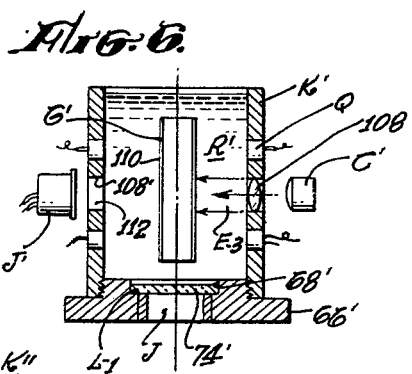
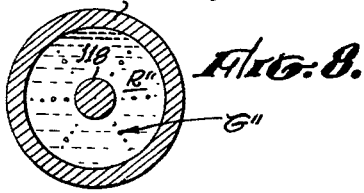
DONALD LUTHER ENSLEY,
INVENTOR.
BY William C. Babcock
Attorney.

United States Patent Office 3,164,022
Patented Jan. 5, 1965

3,164,022
ACOUSTICALLY SUPPORTED MOTION SENSOR AND METHOD
Donald Luther Ensley, 2057 Province Lane, Dallas, Tex., assignor of one-third to Space Age Development Corporation, Hawthorne, Calif., a corporation of California and one-third to Harvest Queen Mill & Elevator Company, Dallas, Tex., a corporation of Texas
Filed May 29, 1961, Ser. No. 113,546
24 Claims. (Cl. 73—505)

The present invention relates to detection or sensing motion such as acceleration and directional deviation and more particularly to the method and system involved in the support and utilization of a seismic mass in an acoustic field in a medium characterized by pressure-dependent density. This application is a continuation-in-part of application Serial No. 778,673, filed December 8, 1958, now abandoned.

In sensing motion such as displacement, velocity or acceleration, various systems have been devised for generating electrical functions which are dependent in magnitude upon the character of the motion and are keyed in dependence upon the direction or sense of the motion. For example, in detecting the deviation of movement of a body in flight from a predetermined path of travel referenced against a particular system of coordinates, the detection of the acceleration of the body during travel along such path in general has been accomplished through the use of the family of devices which includes gyroscopes. Various electromechanical suspensions have been provided for measuring displacement, velocity and acceleration for such purposes as seismic studies and materials testing and inertial guidance.

In contrast with such systems wherein a mechanical linkage in general characterizes the support of a mass by springs or on rotational axes as in the case of gyroscopes, the present invention employs a seismic mass so supported that movement thereof is not subject to inherent limitations such as the threshold limit and hysteresis. Rather, the seismic mass is supported in an acoustical sound field which is characterized by the development of time average forces sufficient to support the seismic mass without the attendant problems which would accompany fluid flow in the supporting medium. The sound field is so shaped as to provide resilient restraint on the seismic mass to position the same at a reference location in the sound field. A sensing system is then employed for determining the magnitude and direction of movement of the seismic mass relative to the sound field.

The foregoing may be contrasted with prior art techniques developed for detecting the deviation, for example, of a moving body from a predetermined trajectory and the magnitude of such deviation where it is necessary that the system respond with dispatch sufficient to permit adjustment of the body to return the same to its original or desired course. Such problems have recently assumed major importance with the advent of the medium and long range guided missile and submarine missions. Gyroscopes, together with associated components, have been considered to be essential elements in missile guidance systems and for submarine navigation. While the gyroscope has for many years been literally considered the standard instrument for maintaining a fixed point of reference from which undesired deviational movement of a traveling body may be measured, yet when employed for this purpose some serious inherent operational disadvantages have been encountered. Such disadvantages in the gyroscope become more significant with each succeeding year as more stringent requirements have been fixed.

Missiles propelled by liquid fuels require relatively long pre-firing periods during which the liquid fuel is pumped or otherwise transferred thereto from suitable storage facilities. However, on development of a missile employing solid fuels, the long pre-firing period no longer is required since such missiles can be fired with but a few seconds notice.

The use of gyroscopes in missiles is unsatisfactory because they embody heavy rotors that must rotate at high speeds in order to operate at peak efficiency. Such rotation can only be attained after being gradually brought up to speed during warm-up periods of from twenty to thirty minutes duration. Continuous operation during missile stand-by periods is not feasible because gyroscopes have a limited useful life during which they will operate within the degree of accuracy required. Even the testing operations on gyroscopes cause rapid deterioration due to wear on the bearings and journals.

Another operational disadvantage of a gyroscope, apart from those above mentioned, is that a gyroscope is a precision mechanism of delicate construction and must be handled and transported with the utmost care. Furthermore, gyroscopes are sensitive to exposure to unfavorable climatic conditions.

It is a primary object of the present invention to provide a sensing system free from threshold frictional effects and hysteresis and highly sensitive to accelerations or other modes of movement. It is a further object of the invention to provide a sensing system in which a seismic mass is restrained ultrasonically. It is a further object of the invention to provide a method and system of sensing motion through the restraint of a seismic mass by the development of forces representative of time average radiation pressures developed in a compressible medium in which the seismic mass is slightly buoyant. A further object and purpose of the invention is to provide directional deviation indicating means for use on a movable body such as a missile, submarine, ship or the like that moves through a fluid medium as water, air or through inertial space to not only indicate deviation of the moving body relative to an elected axis of a moving system of coordinates that are free of twisting and acceleration, but also to indicate the magnitude of such deviation, and if desired, to detect acceleration of the body and the magnitudes of the directional components thereof.

A major object of the invention is to provide a directional deviation indicating device which has no high speed rotating elements, that requires literally no warming-up period in order to be operative, and one that has a useful life of duration which is unlimited as compared to the limited useful life of equipment heretofore available.

Yet another object of the invention is to furnish a device that is light in weight yet of rugged construction, extremely compact, unaffected by wide variations in temperature, adapted to withstand the extreme accelerating forces encountered during missile take-off, and can be utilized to supply the following information:

(a) Directional deviation of the body in which it is installed relative to a predetermined reference axis.
(b) The magnitude of such deviation.
(c) Acceleration of the body relative to a particular predetermined reference axis.
(d) The magnitude of such acceleration.

The present invention permits embodiment in a single instrument of directional deviation indicating means as well as acceleration indicating means. Thus, the present invention minimizes the possibility of failure of one of two instruments, for it provides two types of information from the same equipment.

A further object of the invention is to provide directional deviation indicating means, as well as acceleration detecting means, that not only detect and supply the magnitude of deviation of a moving body and the acceleration thereof, but transmits signals of varying intensity mathematically related to the above magnitudes which may be utilized by conventional means to correct the course of the body through travel to compensate for the undesired deviation or acceleration, which signals is susceptible of use by presently existing equipment to correct the course of the body by such conventional expedients as:

(a) Varying the positions of one or more control surfaces.
(b) Actuating one or more jet vanes.
(c) Varying the positions of one or more movable jets.
(d) Varying the operating conditions of fixed steering jets.

More particularly, there is provided in accordance with the present invention a sensing system which includes structure forming a container for a volume of compressible liquid with means therein for establishing a divergent sound field in said liquid. A geometrical solid in said medium is resiliently constrained at a reference location by the field. A sensing system is then provided for determining movement of the solid relative to the container.

In a more specific aspect the invention relates to a sensor system in which there is provided an acoustic transmission medium in which density is a function of pressure. Means are provided for generating a divergent ultrasonic field in the medium. A geometrical solid in the medium is provided for modifying by interaction with the sonic field the time average pressure gradient in said field so that the solid is normally restrained at a reference position in inertial space and with respect to the medium. Means are then provided for sensing movement of the geometrical solid relative to the rest of the system. In one embodiment of the invention the geometrical solid is made slightly buoyant within the medium so that it is responsive to acceleration. In a further aspect of the invention, the geometrical solid is matched as to density of the medium so that due to its own inertia it serves to sense rotational displacement. In a further aspect of the invention, there is provided a sensing system having an element which is physically supported and restrained at a reference position by the time average pressures developed in a compressible medium due to the non-linear rectification of an oscillatory acoustic field.

For a more complete understanding of the present invention and for further objects and advantages thereof, reference may now be had to the following description taken in conjunction with the accompanying drawings in which:

FIG. 1 is a perspective view indicating installation of an embodiment of the invention on a body whose motion is to be sensed;

FIG. 1A is a simplified schematic illustration embodying the present invention;

FIG. 1B is a plot of a portion of a time average pressure field produced in the system of FIG. 1A;

FIG. 1C is an isometric view of a portion of the system of FIG. 1A;

FIG. 1D illustrates a further embodiment of the invention for measuring acceleration;

FIG. 1E illustrates an embodiment of the invention for measuring rotational deviation;

FIG. 1F illustrates a modification of the sensor unit of FIG. 1E;

FIG. 1G is a modified element from the system of FIG. 1E;

FIG. 2 is a vertical cross-sectional view of a preferred form of the invention;

FIG. 3 is a transverse cross-sectional view of the device shown in FIG. 2, taken on line 3—3 thereof;

FIG. 4 is a perspective view of a combined liquid holder and ultrasonic sound generating device in which a crystal that exhibits piezoelectric activity is suspended in a body of liquid;

FIG. 5 is a diagrammatic perspective view of the directional deviation sensing device utilized with the preferred form of the invention;

FIG. 6 is a vertical cross-sectional view of a modification of the preferred form of the invention;

FIG. 7 is a longitudinal cross-sectional view of the first alternate form of the invention;

FIG. 8 is a transverse cross-sectional view of the first alternate form of the invention, taken on line 8—8 of FIG. 7;

FIG. 9 is a fragmentary side elevational view of the vertically adjustable light housing shown in FIG. 7; and FIG. 10 is a longitudinal cross-sectional view of a second alternate form of the invention.

Reference is made to the drawings, particularly to FIG. 1, to illustrate the problem involved in the detection of motion as herein provided. If the body A is traveling along a given course, any deviation from that course may be considered to represent a rotational deviation represented by components along each of the three axes X, Y and Z.

The suspension of a motion-sensing element becomes critical when high resolution is required. Spring systems are subject to temperature variations. Bearing-mounted suspensions are subject to mechanical wear and have threshold limits. Other systems of the prior art are characterized by the presence of flow in the suspension or in the element itself. For example, in a suspension of a magnetic mass in a magnetic field the flow of vector electrical currents associated with the suspension has been found to introduce errors which are substantial and which cannot readily be compensated. Suspension of a seismic mass in fluid mediums by the flow of fluid also introduces incalculable errors.

The present invention is to be distinguished from such systems in that it provides for a suspension of a sensing element which is substantially free from threshold effects and hysteresis with usually encountered inherent limitations of flow as characterize the prior art systems substantially eliminated.

Applicant has devised a method and system for sensing motion which involves the suspension of a seismic mass in a compressible medium in which a divergent sound field is produced. The interaction of the seismic mass in the compressible medium with the divergent sound field may be so controlled as to modify the time average pressure gradient due to the non-linear rectification of the sound field. Forces are thus developed on the seismic mass which normally restrain the same in a reference or null position. Upon displacement from the reference or null position, the forces on the seismic mass change, tending to return the seismic mass to the null position. The forces thus produced are dependent in magnitude upon the magnitude of relative motion between the seismic mass and a reference position. Thus there is effectively produced an acoustic spring-like suspension free from the substantial limiting factors of the prior art.

In the form illustrated an accelerometer 210, FIG. 1A, may be mounted on body A, FIG. 1, to sense acceleration thereof. Accelerometer 210 includes a relatively shallow cup 211 which contains a compressible liquid 212. In this embodiment a pedestal 213 is mounted coaxially within the cup 211, extending upwardly from the bottom to support a cylindrical electroacoustic transducer 214. The transducer 214 is mounted on a shoulder at the upper end of the pedestal 213, the latter extending into the bottom end of the transducer 214. The pedestal 213 may be made from a Teflon cylinder through which there is provided a pair of holes 215 and 216. Electrical conductors 215a and 216b extending from terminals 217 and 218 pass through the holes 215 and 216, respectively, to complete electrical connections to the outer and inner electrodes on the transducer 214.

The transducer 214 is a relatively short cylinder of electrostrictive ceramic material. In the above embodiment the transducer 214 is of 1.256 centimeter outside radius with a wall thickness of about .31 centimeter and is 1.256 centimeters in length.

A rigid cylinder 219 having an extremely thin wall is mounted concentrically with reference to the pedestal 213 and extends upward above the upper limits of the transducer 214. Cylinder 219 serves as a streaming filter to eliminate or minimize the end effects of the transducer 214. The cylinder 219 is mounted on a shoulder at the lower end of the pedestal 213. The cylinder 219 serves as a streaming filter to minimize the end effects from sonic radiation from the crystal 214. However, at ultrasonic frequencies it has little if any effect on the transmission of the sonic waves outwardly through the medium 212.

A geometrical solid in the form of a short, thin-walled cylinder or ring 220 is immersed in the liquid 212 encircling the driving transducer 214 as to be generally concentric therewith. The ring 220 may be formed from magnesium, dichromate treated, and having a density of about 2.1 grams per cc. The liquid 212 may be a mixture of tetrabromo-ethane and m-bromo-toluene having a density slightly greater than 2.1 grams per cubic centimeter so that the ring 220 is slightly buoyant. The difference in mass of the ring 220 and the displaced fluid represents the seismic mass of the accelerometer.

The system means suitable for sensing motion of the cup 211 relative to ring 220 is illustrated as including a light source 221 which is encased within a housing 222 having a pair of slits to permit light to travel along paths such as paths 223, 224. When the ring 220 is concentric with the source 214, the light beams reflected from the upper curved surface of the ring 220 fall upon scales 225 and 226 at zero positions. Movement of the cup 211 to the right or to the left causes a displacement of the reflections onto the scales 225 and 226 that are somewhat amplified by reason of the curvature of the upper surface and thereby provide a means for sensing or measuring relative motion between the ring 220 and the source 214.

The light source 221 and the scales 225 and 226 are maintained in a fixed position relative to the cup 211 so that all elements in the system are fixed except the ring 220.

The conductors 227 and 228 extending from the terminals 217 and 218 are connected to the output terminals of a high frequency voltage generator and driver unit 230. The driver unit 230 excites the transducer 214 to produce cavity resonance. A standing wave pattern is thus developed in the medium 212. Medium 212 formed of the constituents above identified is a compressible medium. The field produced by the transducer 214 is a divergent field. Under such conditions a time average pressure field is developed within the medium. This pressure field is due to the non-linear rectification of the alternating acoustic field produced by the transducer 214.

The time average radiation pressure profile is utilized in the present invention as forces of sufficient magnitude are present to support and restrain a seismic mass represented by the ring 220. More particularly, based on the assumptions (1) the liquid in the cup 211 has negligible viscosity, (2) streaming has been filtered out, and (3) the acoustic disturbance is in interaction with the rigid body 220, the equation for motion may be expressed as follows:

$$\rho\left(\frac{dv_i}{dt}\right)+\frac{\partial P}{\partial x_i}=0 \qquad (1)$$

where $\rho$ is density of liquid 212, $dv_i/dt$ is the rate of change with time in the particle velocity, and $\partial P/\partial x_i$ is the pressure gradient in the medium 212 as a function of distance $x_i$.

The equation for mass continuity is:

$$\frac{\partial P}{\partial t}+\frac{\partial}{\partial x_i}(\rho v_i)=0 \qquad (2)$$

where $\partial P/\partial t$ is the rate of change with time in the pressure, and $\partial/\partial x_i(\rho v_i)$ is the density-velocity gradient.

Utilizing the foregoing assumptions and Equations 1 and 2, it can be shown that the time average excess pressure $\overline{P}$ within the medium is:

$$\overline{P}=\rho\frac{o}{2}\left[c^2\left(\frac{\partial\phi}{\partial t}\right)^2-(n\nabla\phi)^2\right] \qquad (3)$$

where $c$ is the phase velocity of sound in liquid 212;

$\partial\phi/\partial t$ physically represents an excess pressure increment due to the fact that the pressure waves are conducted through the compressible non-linear medium 212. (This simply means that a pressure disturbance which is sinusoidally time dependent causes the density of the medium to acquire a sinuous time dependence. The instantaneous product of pressure and density then involves a term expressed as $(\sin^2 wt)$ which generates a time average);

$\nabla\phi$ represents the fact that particles of the medium have acquired velocity due to the forces acting on them from the pressure. (Since the pressure itself has a time rectified component, so does the particle velocity, in fact $v_i=-\nabla\phi$); and $(n\nabla\phi)^2$ is the square of the particle velocity.

Utilizing the foregoing Equation 3 and setting the necessary boundary conditions for a cylindrical wave, the following distinguishing characteristics have been established with respect to the pressure wave:

(1) A cylindrical wave changes its shape as it departs or travels from the source 214 leaving a wake behind it.

(2) The time average pressure and hence the force at the boundary depends upon the square of the pressure generated by the source.

For a cylindrical wave in the system of FIG. 1A of frequency equal to 704 kilocycles, the time average pressure field is plotted in FIG. 1B. The pressure at the inner boundary of the cylinder 220 divided by the pressure at the outer surface of the transducer 214 is plotted as ordinates against abscissae represented in terms of the radius of the boundary, i.e., the radius of the inner surface of the ring 220. The scale of FIG. 1B is greatly expanded and shows only a portion of the zone between the transducer 214 and the wall of the chamber 211 so that the configuration of the field immediately adjacent the walls of the cylinder 214 may be understood. The field is cylindrical and thus symmetrical with respect to the axis of the unit 210. The surfaces formed by opposite sides of transducer 214 are illustrated by the vertical lines 214a and 214b. The data plotted is representative of the case where the driver radius is 1.256 centimeters. It will be noted that the ratio of the pressure at the boundary to the pressure at the source varies cyclically and is representative of the non-linear rectification of the sound field as influenced by the squared function above discussed.

The radius of the ring 220 is such that operation is in a stable region. The curves of FIG. 1B are plotted to illustrate the pressure gradient or the radiation pressure profile for various values of boundary radius, i.e., the inner radius of ring 220. If the boundary radius is equal to the source radius, then the pressure at the boundary is the same as at the source since the two are at the same point. However, as the radius of the boundary increases, the pressure rises, as evident from the positive slope in the zones 231 and 232. At a boundary radius of 1.3 centimeters the pressure profile reaches a maximum, followed by sections 233 and 234 of the profile having a negative slope. The pressure profile then passes through minima 235 and 236 at about 1.36 centimeters. There then are identified sections of positive slope 237 and 238 followed by sections of negative slope 239 and 240.

If a ring 220 is selected having an inside radius greater than 1.3 centimeters and less than 1.36 centimeters, it will be in a stable operating zone. That is to say, if the ring has surfaces represented by the lines 240 and 241, then upon movement tending to increase the spacing between surfaces 241 and 214a and to decrease the spacing between the surfaces 240 and 214b, the pressure on the surface 241 will decrease. At the same time the surface 240 moves into a zone of higher pressure. This in effect tends to restore the ring having surfaces 240–241 to a position which is symmetrical with respect to the surface 214a, 214b. It will be noted that a ring would operate in a stable zone with a radius in excess of 1.42 centimeters and less than 1.48 centimeters. A series of stable operating zones experimentally may be found with rings of progressively increasing radii from the center of the crystal 214. The magnitude of the restoring force in each case may be controlled by the amount of power translated into acoustical energy by the transducer 214 and the operating point selected on the time average field profile.

It is significant that the forces which restrain or position the ring 220 are independent of flow. That is to say, there is no electrical flow, i.e., flow of electrical currents, within the ring 220. Furthermore, the operation in the field represented by the curves of FIG. 1B is not accompanied by fluid flow in the medium 212. Thus, serious limitations inherent in prior art devices are eliminated in the present case. More particularly, it has been found that the torque on the ring 220 is somewhat less than $10^{-5}$ dyne centimeters and may be operated in the region of $10^{-6}$ to $10^{-7}$ dyne centimeters. The significance of the foregoing values may be appreciated when it is understood that in presently available systems for measuring rotational displacement the inherent values of torque are three to four orders of magnitude greater than the system of the present invention. For example, torques of the order of $10^{-3}$ dyne centimeters present in existing sensing devices are extremely troublesome.

In accordance with the present invention there is provided as above described in connection with FIG. 1A a means for sensing accelerations of the suspended body as in the X–Z plane. As hereinafter described, means are provided for sensing the rotation of the suspended element 220 in inertial space. For example, with cup 211 fixed to the earth, which rotates at a rate of about 0.140° per minute, the ring 220 remains fixed in inertial space so that unless compensated there will be rotational displacement of the ring 220 relative to the cup 211. Rather than permit the relative rotation between the ring 220 and the cup 211, the cup 211 may be slaved to the ring 220 and adjustments necessary to maintain the ring 220 in a fixed relation not only in inertial space but also within the cup 211 are measured to indicate the magnitude and the rate of rotational displacement.

Characteristic of the present invention is the use of a divergent sound field in a compressible medium, that is, a medium which is characterized by a pressure-dependent density. A standing wave pattern is set up between the sound source and a geometrical solid body in the field. The standing wave pattern is alternating in character. The non-linear rectification of this field produces time average force fields which serve to support the solid with a controllable spring-like force but without appreciable torque. Except for effects at the end of the source cylinder, there is no flow either of vector currents or of fluid in the field.

While the system of FIGS. 1A and 1C is highly simplified, it represents an operable system which has been found to be extremely stable. Measurements of acceleration are thus made possible. In addition, rotational deviation may be carried out in accordance with the present invention as will now be described.

In FIG. 1D there is illustrated a preferred embodiment of the system as adapted to sense acceleration of a body on which the system is mounted. More particularly, there is provided a cylindrical housing 250 which is closed at the ends thereof by caps 251 and 252. The upper cap 251 supports an inverted insulating pedestal 253 which in turn supports a short cylindrical transducer 254. Similarly, the lower cap 252 supports a cylindrical pedestal 255 which in turn supports a short cylindrical transducer 256. Transducers 254 and 256 are mounted coaxially within the housing 250. At a mid-point in the housing a pair of insulating bosses 260 and 261 extend into the housing and serve to support a spherical transducer 262. The transducer 262 preferably is mounted at the geometrical center of the housing 250. An element comprising a seismic mass M is positioned within the housing and includes a spherical shell 263 having cylindrical extensions 264 and 265 which are of approximately the same radius as the radius of the shell 263. A pair of apertures 266 and 267 are provided in the suspended element at the juncture between the cylindrical extensions 264 and 265 and the shell 263 to permit passage therethrough of the bosses 260 and 261. The shell 263 and the extensions 264 and 265 are symmetrical with respect to the longitudinal axis 250a of the housing 250.

The housing 250 is filled with a compressible sound-transmitting medium such as above described in connection with FIG. 1A. The suspended mass M is slightly buoyant in liquid. A metallic ring 270 is mounted on the upper end of the cylinder 264 and faces a second metallic ring 271 which is mounted on the inside of the cap 251. Similarly, a ring 272 is mounted on the end of the cylinder 265 and faces a metallic ring 273 mounted on the inner surface of the cap 252.

The device thus constructed may serve when suitably actuated to sense accelerations along the axis 250a.

The mass M is restrained laterally in housing 250 by a pair of relatively high intensity cylindrical sound fields. The motion of the mass M along the axis 257 is opposed by variations in a relatively low intensity spherical sound field. In addition, cylindrical sound fields are produced by excitation of transducers 254 and 256 from a source 275 which oppose motion of the mass along the axis 257. Channel 254a extends from source 275 to the transducer 254 to excite the same for the production of cylindrical waves as above explained in connection with FIG. 1A. Similarly, channel 256a leads from the source 275 to the transducer 256 to excite the same for the production of a second sound field.

The sound fields produced by transducers 254 and 256 coact with the ends of the cylinders 264 and 265, respectively, to maintain them in a position which is substantially fixed and opposes any relative motion transverse to the longitudinal axis 250a. The fields produced by transducers 254 and 256 are of substantially high intensity so that the spring constant effective to maintain the cylinders 264 and 265 coaxially within the cylinder 250 is high. The sound field may be considered to have the same character as illustrated in FIG. 1B where the radius $d_c$ corresponds in FIG. 1B with the radius of the driving cylinder. The dimension $b_c$ is representative of the radius of the cylindrical interface within the sound field, i.e., surfaces 214a and 214b. By this means the cylinder is maintained in a fixed lateral position by a suspension system which is free from hysteresis or threshold effects.

The motion of the housing 250 relative to the suspended mass M is sensed by the variations in electrical capacitance between the rings 270 and 271 and between the rings 272 and 273. The field which opposes relative movement in the direction of the axis 250a is established by excitation of the spherical shell-like transducer 262. The transducer 262 is connected to the output of a driving oscillator 280 by way of channel 281. The driving system 280 may in practice be the same system 275 with suitable level controls on the channels leading to the separate transducers.

In the form indicated the driving circuit includes an oscillator 282 which is coupled by way of transformer 283 to a first push-pull amplifier stage 284 and thence by way of transformer 285 to a second push-pull amplifier stage 286. Amplifier 286 is a power amplifier which drives an output transformer 287 for the application of a driving voltage to the transducer 262. The acoustic field produced by the spherical shell 262 though spherical has the same essential character as illustrated in FIG. 1B for the cylindrical case. The spherical field is so controlled as to permit relative movement between mass M and the shell 262 in the direction of axis 250a within a range dependent upon the range of accelerations to be measured.

When the mass M moves axially relative to the housing 250, for example, as upon a downward acceleration of housing 250, the spacing between the rings 270 and 271 tends to become decreased whereas the spacing between rings 272 and 273 tends to become greater. The electrical capacitors formed by the rings 270, 271 and 272, 273 respectively are relatively small in magnitude. They may be considered to be connected in series with a larger condenser, one plate of which comprises the walls of the cylinders 264 and 265. The second plate of the larger condenser includes the wall of the housing 250. The housing 250 is connected electrically to ground as at point 288. The ring 271 is connected to the input of a sensing system 290 by way of a conductor 291. The ring 273 is connected to the sensing circuit by way of conductor 292. The sensing circuit 290 is a highly sensitive system which is capable of translating the relatively small changes in capacity as between the rings 270–273 into a voltage which is representative of movement of the housing 250 along the axis 250a.

More particularly, the measuring system 290 includes an oscillator 293 which has an output coil 294 connected by way of conductor 295 to a plate 296 adjacent to the envelope of a gas tube 297. A second plate 298, positioned on the side of the tube 297 opposite the plate 296, is connected to ground. The tube 297 has a pair of electrodes 300 and 301 extending into the gaseous atmosphere maintained within the envelope. The conductors 292 and 291 are connected directly to the electrodes 300 and 301, respectively.

In one embodiment of the invention the tube 297 was in the form of a glass envelope about ½″ in length and ¼″ in diameter. The electrodes 300 and 301 were tungsten rods of about 1/32″ in diameter. They extended into the envelope about ⅜″ and had a separation between the adjacent surfaces thereof of 4 millimeters. The envelope was evacuated and then was loaded with xenon gas at a pressure of about ½ millimeter at room temperatures. Operation has been found to be satisfactory with xenon gas pressures up to about 1½ millimeters as well as somewhat lower levels. Other inert gases such as neon, argon or helium are suitable but best results have been experienced with xenon.

Electrodes 300 and 301 are also connected by way of a filter device including coils 302 and 303 and a capacitor 304 to the input of an amplifier 305. To eliminate frequencies of signals from oscillator 293 the amplifier 305 includes a first transistor 306 connected at the base to a resistor 307 which leads to one terminal of the coil 302. The base is also connected by way of resistor 308 to the emitter electrode which in turn is connected to a B+ terminal 309. The collector electrode is connected by way of resistor 310 to a ground terminal. The circuit for the other stage of amplifier 305 and comprising the transistor 311 is identical to the circuit for transistor 306. A push-pull output is provided which may be applied to a suitable measuring system 312 which includes an oscilloscope 313 on which the variations in capacity produced by acceleration in the system may appear as deflection of the cathode-ray beam. The system also includes a meter 314 which serves to provide a direct or numerical measure of the acceleration. A recording device 315 also is included to provide a continuous record of the time variations in acceleration.

In order to realize the advantages of the precision suspension of the system in housing 250, an extremely sensitive and stable displacement device is required. In this connection it should be remembered that displacements of the order of fractional micro-inches are to be detected. The use of the device 297 excited as above described permits the production of a usable voltage which is not dependent completely upon high electronic amplification although in some ranges a more conventional amplifying system might be adequate. The gas tube 297 is characterized by non-linear ionization when excited by a radio frequency signal. The oscillator 293 is adapted to produce an ionizing voltage at a frequency of the order of 400 kilocycles. This voltage is applied to the plasma within the envelope 297 as an electrostatic field by applying the R.F. voltage developed to the plates 296 and 298. The variations in capacitance between rings 270–273 serve to vary the effective capacity across the electrodes 300 and 301 so that as a result a D.C. voltage, which is linear with very small values in capacitance change, will appear across the electrodes 300 and 301.

It will be appreciated that the oscillator 293 may be replaced by a connection extending directly to the oscillator 282. However, in order for clarity the separate elements have been illustrated. The capacitances in the housing 250 together with the connection to ground of the housing itself serve as a hybrid type bridge element which coacts with the circuit 305 to provide a bridge type measurement in which environmental gap fluctuations as between rings 270, 271 and 272, 273 are minimized or eliminated.

In FIG. 1E there is illustrated a system generally of the type illustrated in FIG. 1A but which is adapted to sense rotational deviation. Where consistent, parts have been given the same reference characters as in FIG. 1A. The cup 211 is mounted on a platform 320 which is supported on a bearing 321. The platform is thus mounted for rotation around the axis of shaft 322. The bearing unit 321 is to be coupled to a body whose motion is to be sensed such as body A.

The cup 211 and the platform 320 are movable relative to body A. The cup 211 is provided with a cap 211a which contains a compressible liquid 212. In this embodiment of the invention the cylinder 220 is selected with reference to the liquid 212 as to be slightly buoyant. The ring 220 preferably is formed of material having the property of rotating the electric vector of light entering the same through a given angle before the light leaves the ring. Preferably the axial length of the cylinder 220 is equal to that of a half-wave plate. Light from a source 322 is transmitted to the cup 211 by way of a collimating lens 323. Light beams may pass downward into the cup 211 through windows 324 and 325. The windows 324 and 325 are of polarizing material. The polarized light then passes downwardly through the length of the cylinder 220 and then through polarizing windows 326 and 327 to light detectors 328 and 329. The detectors 328 and 329 are connected in series and thence by way of channel 330 to the input transformer 331 of an amplifier system. The windows 324–327 are so oriented with respect to light from the lamp 323 that with the ring 220 in a given position, light will not be permitted to pass from source 322 to the detectors 328 and 329. However, if the platform 320 rotates relative to the ring 220, then the effect of the ring 220 in transmission of light entering by way of windows 324 and 325 is to permit transmission of light to the detectors 328 and 329. When this is the case, an electrical signal appears on channel 330 which is dependent upon the rotational deviation of the case 320 relative to the ring 220. The driver 214 and the ring 220 are symmetrical with respect to the axis of the cup 211 being initially positioned by the streaming filter 219 such that when the driver 214 is energized the ring 220 will lock in coaxial position in the sound field. The fluid level in cup 211 preferably is such that the ring 220 extends equally above and below the ends of the driver 214.

The source 214 is excited by way of conductors 227 and 228 to establish the time average sound field in the medium 212 resiliently to support the ring 220.

It has been found that such support for ring 220 has an extremely low torque thereon. The error torque has been found to be three or four orders of magnitude less than on sensing elements in prior art systems. Thus as the platform 320 tends to rotate about the axis of cup 211, the ring 220 will remain in a fixed or reference position. The signal produced at the output of the cells 328 and 329 may then be utilized through the amplifier system 340 to drive a motor 341 which in turn actuates a Selsyn transmitter 342 by way of a suitable gear train 343. The output of the Selsyn transmitter is then transmitted by way of channels 346 to a Selsyn receiver 344 which in turn is coupled by way of linkage 345 to the shaft 322.

A feedback loop is apparent in FIG. 1E. The loop seeks a balance or null position. Thus when the body A begins to rotate about the axis of the cup 211, a signal is produced which is applied to the amplifier 340 and thence to the transmitter 342 and receiver 344 to rotate the platform 320, maintaining the position of the cup 211 unchanged relative to the position of the ring 220.

While the ring 220 may be initially positioned longitudinally of the cup 211 by buoyancy, it will hereinafter be shown that a time average force field within the medium 212 may be utilized to provide a suspension not only laterally of the cup 211 but longitudinally so that the ring 220 will be positioned in the cup as to respond to the field from the driver 214.

In FIG. 1F there is illustrated a modification of the system which generally corresponds with FIG. 1D but which is adapted to sense rotational deviation as contrasted with acceleration. In this embodiment similar parts have been given the same reference characters as in FIG. 1B. The housing 250 is filled with a compressible liquid such as the liquid 212 of FIG. 1A. A mass M is positioned coaxially within the housing 250 and includes the spherical shell 263 and the cylindrical extensions 264 and 265. A central driver of spherical shape 262 is mounted on the axially-positioned pedestals 260' and 261'. This embodiment thus differs from that of FIG. 1A in that the driver shell 262 is supported axially of the housing 250 so that the mass M may rotate freely around the axis of the housing 250.

As in the case of FIG. 1E, the supported element or mass M is formed of a material having the property of rotating the electric vector of the light from lamp 322' which enters by way of collimating lens 323' and then passes into the housing by way of polarizing windows 324' and 325'. As in FIG. 1E, rotation of the mass M relative to the housing 250 will change the transmission of the light beams from lamp 322' to the cells 328' and 329'. Thus rotational deviation of the housing 250 relative to the mass M may be sensed. The housing 250 may be substituted for the cup 211 of FIG. 1E and thus included in a suitable Selsyn system for maintaining fixed the relationship between the mass M and the housing 250. The extent of movement necessary to maintain such fixed relation may then be recorded as a function of time to provide a direct measure of the rotational deviation of the housing 250 relative to mass M.

Significant is the fact that the torques imposed on the element 220 of FIG. 1E or the element M of FIG. 1F by their respective suspensions are sufficiently low that even though the moment of inertia is small the stability of either device in the supporting field is much better than in rotating systems such as gyroscopes where the mass is given a high rotational speed in order to increase the moment of inertia with respect to a particular axis. The gyroscopic type instruments have proceeded along the line of increasing the moment of inertia of the fixed body or reference body in order to provide stability for the system. In the present case the reference body has the moment of inertia characteristic of the body at rest. The suspension system has been so modified, however, that the stability of the mass even when static is greater than that found in systems where the inertia is multiplied. Thus applicant has taken a course basically opposite those characteristic of the prior art systems.

It will be noted that in FIGS. 1E and 1F the ring 220 and the mass M, respectively, were described as forming half-wave plates for rotating the electric vector of the light beams transmitted therethrough. It will be understood that the control of light reaching the detectors 328 and 329 and 328' and 329' may be accomplished other than through the use of half-wave plates. For example, the light path may be suitably masked by elements at least some of which are carried by the supported element so that the amount of light transmitted to the detectors will depend upon the relative rotational positions. By way of example, control elements such as employed in the Patent No. 2,301,396 to Graf may be suitable where movable slits pass light to detectors in dependence upon their relative positions in their light beam. In any case the rotational position of the suspended element relative to its housing is sensed to produce an output signal which is then employed in a servo-system to maintain substantially unchanged the relative positions of a reference element and its housing.

In accordance with the present invention, it is possible to utilize the advantage of a system supported in a time average sound field developed in a compressible medium and at the same time incorporate some of the advantages of increased inertia by the use of a rotational mass. More particularly, in a device for the character illustrated in FIG. 1A the supported mass such as the ring 220 of FIG. 1G may be formed to be caused to rotate when it experiences the forces in the time average sound field. More particularly, the inner surface of the ring 220, FIG. 1G, may be fluted or may be provided with vanes such as present at the zones 350. In the form illustrated the vanes are milled in the inner wall of the ring 220. Time average forces are thus developed on the angular surfaces formed by the flutes themselves so that a rotational motion is imparted to the ring 220. Thus the angular momentum is substantially increased while being supported in a suspension system having low error torque and zero hysteresis and threshold limits. A device of this character and utilizing the time average force field may be given further impetus along the line of multiplying the effective inertia of the suspended mass by utilizing a wobbling motion with reference to the axis of the cylinder 220 of FIG. 1G rather than to rotation about such axis. A device employing wobble motion while suspended in a sound field is illustrated in FIG. 2. More particularly, unit B-2, as will be seen in FIG. 2, includes a source of light located at a fixed position above a collimating lens D that directs a beam of light E polarized in a single plane F by passage through a first polarizing medium P, and thereafter downwardly through a light conductive body G, which is preferably elongate. In addition to being light conductive, body G has the property of rotating the electric vector E-1 of light E entering body G through an angle H before the light leaves body G as a beam E-2, as best shown in FIG. 5.

After leaving body G the path of light beam E-2 is such that all of it contacts a second polarizing medium P-1. Medium P-1 is coaxially aligned with first medium P, and body G is situated therebetween. Second medium P-1 is so rotationally disposed relative to medium P that only light that is polarized in a plane normal to the plane of polarization of the first medium can pass therethrough. Thus, if the body G were removed from its position between the first and second mediums P and P-1, the polarizing planes of these mediums, due to their relative rotational positioning, would cause the second medium to completely obstruct the passage of light therethrough. A photosensitive cell J is disposed directly under the second polarizing medium P-1, and receives all light E-2 leaving the second medium. Cell J generates an electric current, the magnitude of which is dependent upon the quantity of light E-2 falling thereon.

A rigid cylindrical shell K is provided which has transparent, optically inactive end pieces L and L'. A body of liquid R is contained in this shell that is optically inactive, light conductive, and is of substantially the same density as body G.

Two small pellets M and M' are mounted on opposite ends of body G and are fabricated from a magnetic material. Two electromagnets N and N' that are preferably of ring-shaped configuration are located adjacent opposite ends of shell K and so positioned as to present no interference to the passage of light therethrough. An electrical circuit O is provided that is normally open, but when it is closed, electrically energizes electromagnets N and N' and the magnetic fields generated thereby attract pellets M and M' to erect body G to the position shown in FIG. 2.

A number of ultrasonic sound generators Q-1, Q-2, Q-3, Q-4, Q-5 and Q-6 are embedded in shell K or otherwise mounted in fixed circumferential and vertical spacing thereon. These ultrasonic generators are alternately excited by means of a conventional electric oscillator circuit (not shown), and caused to direct beams of ultrasonic sound energy T in the criss-cross pattern shown in FIG. 2. These beams pass through the center of body G and cause it to oscillate at a sufficiently high rate to maintain the body in the aligned position between polarizing mediums P and P-1 as shown. Initial positioning of body G in the liquid R is accomplished by energizing the electromagnets N and N', but after actuation of generators Q-1 to Q-6 inclusive, the circuit O to the electromagnets N and N' is broken. No further use of circuit O is made until it is again necessary to erect and position the body G as shown in FIG. 2. Electrical energy generated when light falls on the photosensitive cell J is conducted therefrom through electrical conductors U, also shown in FIG. 2.

The use of the unit above described is extremely simple, and as illustrated in FIG. 2, is longitudinally aligned on the axis Y, with the polarizing mediums P and P-1 being held in fixed relationship with body A. Body G is then rotated to a position between mediums P and P-1 where, when body A is in a truly oriented position relative to axes X and Z in which it is desired to be maintained through its course of travel, no light falls on the photosensitive cell J, and no electrical current is generated by the photocell. It will be apparent that cell J may be either a photocell, or a cell of a type having a known resistance which varies in a known mathematical relationship to the quantity of light to which it is subjected within a unit time.

With the unit B-2 rigidly connected to body A, any directional rotational deviation of this body about Y axis will cause rotation of the polarizing mediums P and P-1 relative to body G when it is held in a fixed, rapidly vibrating position (FIG. 2) due to the excitation of generators Q-1 to Q-6 inclusive. The greater the rotation of mediums P and P-1 about the Y axis relative to body G, the greater will be the quantity of light E-2 falling on cell J, and the greater is the magnitude of the current flowing from cell U to a unit (not shown) associated with body A, which unit is able to utilize the varying magnitudes of electrical current flowing through the conductors U to vary the course of body A and correct any rotational deviation of this body about Y axis.

An embodiment of the invention that has been built and tested, is illustrated in FIGS. 2, 3 and 4. In detailed structure, unit B-2 includes a rigid base 10 from which two identical, laterally spaced supports 12 project upwardly, and a top piece 14 is mounted on the upper surfaces thereof by means of screws 16, or the like. A central bore 18 is formed on top piece 14 and is of such transverse cross-sectional area that all light from bulb C passing therethrough will also pass through body G when this body is subjected to the action of ultrasonic beams T, as previously described.

A ring-shaped flange 20 depends downwardly from the under side of top piece 14 and is concentrically disposed relative to bore 18. First polarizing medium P is circular and fabricated from a sheet material. The diameter of medium P is such as to permit the snug fit thereof within the confines of flange 20. A circular O-ring 22, or other ring-shaped resilient member, engages the lower circumferential edge portion of medium P. A first circular plate 24 is removably affixed to the lower surface of flange 20 by screws 26 or the like, and presses against ring 22 to maintain first medium P in a fixed position between the ring and the under surface of top piece 14. A second bore 28 is formed in the center of plate 24, and a first tube 30 is inserted and held therein, with the third bore 32 of this first tube being in coaxial alignment with first bore 18, but having a larger transverse cross-sectional area than that of the first bore.

A ring-shaped support 34 is provided for lens D that is removably mounted on the upper surface of top piece 14 by screws 36 or like means, and supports the lens in a centered position relative to the longitudinal center line 38 passing downwardly through first bore 18 and third bore 32. Bulb C is held in a socket 40 that is in longitudinal alignment with center line 38. A cup-shaped light housing 42 is provided that includes a cylindrical side wall 44, the upper end 46 of which is flat and on which socket 40 is supported. The mouth of housing 42 slidably engages the exterior surface of support 34. A tapped bore 47 is threadedly engaged by a screw 48, which screw also passes through an upwardly extending slot 50 formed in side wall 44. By loosening and tightening screw 48, housing 42 may be vertically adjusted and supported on support 34.

Two sheet members 52 and 54 are provided (FIG. 3) in which generally semicircular recesses 52a, 54a, respectively, are formed. The surfaces of these recesses are adapted to frictionally engage shell K to hold and maintain the shell in a desired vertical position relative to members 52 and 54. Member 52 is rigidly affixed to supports 12 by screws 56 or other fastening means. Two tapped bores 57 are formed in members 52 that are coaxially aligned with two bores 58 which extend through member 54. Two screws 60 extend through bores 58 and threadedly engage tapped bores 57. By tightening screws 60, shell K can be held at a desired elevation relative to members 52 and 54, as well as supports 12.

The lower interior surface of shell K has threads 62 formed thereon that are engaged by a threaded boss 64 which projects upwardly from a circular member 66 of substantially greater diameter than the exterior diameter of the shell and that partially defines end piece L-1. A fourth bore 68 is formed in the center of member 66 and is in coaxial alignment with counterbore 70. At the junction thereof these bores define a circular body shoulder 72. A circular pane 74 of an optically inactive glass snugly fits within the bore 68 and rests on shoulder 72. A fluid-tight seal between pane 74 and member 66 is effected by the use of a cement (not shown) or other sealing compound.

A second tube 76 identical to first tube 32, except that it is longer, projects upwardly from a fifth bore 77 formed in a second plate 78. Tube 76 and plate 78 are rigidly bonded together. Second plate 78 rests on the upper surface of a second ring-shaped flange 80 projecting upwardly from a cross piece 82 that is affixed by screws 84 to the interior surfaces of supports 12. Cross piece 82 has a sixth and centrally disposed bore 84 formed therein that is longitudinally aligned with center line 38. A rigid plate 86 is provided in which a central recess 88 is formed that partially receives the photosensitive cell J. Plate 86 is removably supported by screws 90 from the under side of cross piece 82 and cell J is in coaxial alignment with bore 84.

The second polarizing medium P-1 which is identical to first medium P except for the rotational positioning of its transmission axis, rests on the upper surface of cross piece 82, and a second O-ring 92 is disposed on the upper circumferential edge portion thereof. Screws 94 extend downwardly through second plate 78, flange 80, and into cross piece 82 to exert pressure on O-ring 92 to maintain medium P-1 in a fixed position relative to medium P.

The body G may be any natural or synthetic crystal possessing substantial piezoelectric properties, and in FIGS. 2 to 4 inclusive, is of substantially the same density as the liquid R in which it is suspended. Some examples of materials which may be used for this purpose include calcite, tourmaline and quartz. These are merely illustrative examples of the materials that may be used in the fabrication of body G, and it is not intended to limit the body to any one of these materials. For convenience of illustration, X-cut quartz crystal was shown in FIG. 2 as the material from which body G was formed, and the beam of light is normal to the optic axis. In this manner the vector of a beam of polarized light E is rotated through an angle H (FIG. 5) as it passes through body G prior to the rotational alteration of the beam of light E-2 which contacts the photosensitive medium P-1.

For ease in rotating body G relative to the polarizing mediums P and P-1 while suspended in the liquid R, it may be desired to provide the body with a very small annular ring 100 at substantially the center thereof, which ring is formed of magnetically hysteric material to serve as a rotor. When such a ring is used and a ring-shaped torque coil (hysteresis motor winding) 102 is supported from the members 12, the electromagnets N and N' are utilized to erect body G to the position shown in FIG. 2 relative to shell K. After such positioning of body G, the torque coil 102 is energized by a circuit 104, and as a result of the magnetic field set up thereby, body G, due to the hysteresis ring 100 rotates about its longitudinal axis and is oriented to an electro-optical null position. In this position the electric vector of all of the light E-2 falling on the first polarizing medium P-1 is that which has been rotated through the angle H normally disposed relative to the transmission axis of the second medium. Accordingly, no light is transmitted to the photosensitive cell J.

Inasmuch as it is undesirable for the body G to be accelerated relative to the liquid R in which it is suspended, the liquid preferably has a density substantially the same as that of body G. When quartz which has a density of 2.65 grams per cubic centimeter is used in forming body G, the liquid R may be a mixture of trichloroethylene and acetylene tetrabromide in proportions such that the mixture has a density of 2.65 grams per cubic centimeter. The material forming the ultrasonic sound generators Q-1 to Q-6 inclusive may be any material, which when excited by a high frequency voltage, vibrates to direct beams of wave energy T toward body G. In the form of the invention shown in FIGS. 2, 3 and 4, it has been found convenient to use barium titanate. In this form of the invention generators Q-5 and Q-6 are preferably electronically in phase, and the four remaining generators Q-1 to Q-4 inclusive are in a "push-pull" arrangement.

The photosensitive cell J may be any one of a number of commercially available devices, the electrical resistance of which is a function of the light intensity falling thereon. This class of devices not only includes photocells wherein an electric current is generated dependent on the intensity of the light falling thereon, but also devices that have a non-resistance value relative to an electric current that constantly flows therethrough, which resistance is decreased in a known mathematical relationship to the intensity of the light beam falling thereon.

In operation, body G is first erected to the centered longitudinally extending position relative to shell K shown in FIG. 2, by electrically energizing the first and second electromagnets N and N'. Rotation of body G on the longitudinal axis 38 is accomplished by electrically energizing the torque coil 102 until, due to the hysteresis ring 100 thereon, body G has rotated to a position where no light emitted from source C falls on the photosensitive cell J. Torque coil 102 is then deenergized until again needed to orient body G relative to the first and second polarizing mediums P and P-1.

The ultrasonic field generators Q-1 to Q-6 inclusive are electrically excited by a conventional electrical oscillator circuit and the body G is alternately angularly displaced in liquid R relative to the axis 38 on which it is aligned, with this angular movement being centered at a point 106, FIG. 5. The longitudinal axis of body G is first displaced to the position 38', FIG. 5, and then to the position 38". This angular reciprocation of body G, which of course is grossly exaggerated in the illustration thereof, results from the time variation of pressure about body G because of the ultrasonic field in which it is disclosed, and due to the "push-pull" arrangement of generators Q-1 to Q-4 inclusive in emitting the wave energy in which body G responds.

It will be apparent that with excitation as above described, and assuming that base 10 is rigidly connected to body A, the device is in an operative condition capable of detecting any directional rotational deviation of body A about the axis thereof.

To further disclose the structure and operation of the invention shown in FIG. 2 to FIG. 4 inclusive, which is made solely for the purpose of illustration and not in any way intended to limit the scope of the invention herein described, the generators Q-1 to Q-6 inclusive are excited with a 1.6 megacycle sinusoidal signal at substantially thirty watts combined power. It will also be apparent that any relative rotation of shell K and first and second polarizing mediums P and P-1 relative to photosensitive cell J from their initially oriented position with body A will be accompanied by an increasing quantity of light falling on the first medium, with this quantity in turn varying the electrical output of cell J to indicate the magnitude of rotational deviation of the body A about axis 38.

A modification of the invention is shown in FIG. 6. This device is employed when it is desired to not only detect directional rotational deviation but also to detect acceleration of the body, laterally from one of the axes. In the present invention this modification is disclosed and illustrated as being used to detect lateral deviation from the axis Y. This modification is identical to that shown in FIGS. 2, 3 and 4, except that a second source of light C' is provided, together with a second photosensitive cell J'. Inasmuch as the embodiment of FIGS. 2–4 and the modification thereof are in most respects identical, for the sake of clarity herein the elements common to both embodiments are identified by the same numerals and letters to which a prime has been added.

In FIG. 6 it will be seen that an opening 108 is formed in a center portion of shell K' in which a second collimating lens is disposed that directs a beam of light E-3 through liquid R' toward body G' which has a coating of opaque material 110 covering the longitudinal surface thereof. Under normal conditions, body G' obstructs passage of light beam E-3 to the photosensitive cell J'. Opening 108 has a complementary diametrically opposed opening 108' formed in shell K' through which any portion of light beam E-3 can pass if not obstructed by body G'. The photosensitive cell J' is fixedly mounted on the exterior of shell K' transversely of the light source C' to receive all light passing through opening 108'. A pane of transparent material 112 is disposed in opening 108'.

It will be understood, however, that if the material from which shell K' is fabricated is transparent and optically inactive insofar as refraction of any portion of light beam E-3 is concerned, the pane of material 112 may be eliminated. Liquid R' may incorporate the same components used in the first form of the invention, but with the density ratio between body G' and the liquid being adjusted to approximately 1.5 whereby body G' is accelerated in a direction to pass through the axis Y (FIG. 6) and normal to the surface of the sheet on which this figure appears. When acceleration in this direction occurs, body G' and shell K' tend to move relative to one another, and due to this relative motion, a portion of light beam E-3 can pass around the light obstructing shell 110 to fall on the second photosensitive cell J', whereby the quantity of light falling on this cell reflects the magnitude of acceleration that shell K' and body A have achieved relative to body G'. Due to the energy field to which body G' is subjected by the ultrasonic generators Q-1' to Q-6' inclusive the body tends to remain in a fixed location at all times relative to shell K'. This energy field is analogous to a spring and tends to at all times return body G to a fixed position relative to shell K' and does so return the body after the period of acceleration has been terminated. This modification of the invention is not limited to the use of light from a source C' as a medium to detect acceleration, but may be any form of energy that is propagated by wave motion, and which is normally obstructed by the layer 110 which is mounted on the longitudinal surface of body G'. It will be understood that if a wave energy form of light is employed, a receiving means responsive thereto to receive that portion thereof passing by body G' must be porvided in lieu of the photosensitive cell J'.

A further modification of the invention is shown in FIG. 7 which is substantially identical to that of FIGS. 2–4, the same identifying numerals being used for the common elements with a double prime affixed thereto. A radio frequency coil 114 is provided that is electrically excitable by a conventional electrical oscillator circuit (not shown), with the coil preferably being disposed within the confines of the tubular member 30''. The lower end of tubular member 30'', as well as the upper end of shell K'', are closed by a circular plate 116 of optically inactive transparent material.

An elongate ultrasonic sound generator 118 is longitudinally disposed within the confines of shell K'' and the ends thereof are preferably affixed to the lower surface of plate 116 and the upper surface of the light transmitting plate 74''. A relatively large number of small bodies G'' having the same properties as the material forming body G in the forms of the invention above described, are placed into the liquid R'' contained within shell K''. By electrically energizing the radio frequency coil 114, an electromagnetic field is set up, and due to the piezoelectric qualities thereof, the generator 118 radiates ultrasonic energy throughout liquid R''.

Bodies G'' assume a pattern in liquid R'', with each one being suspended in a nodal region of cavitation formed in the energized liquid R'', as may be seen in FIGS. 5 and 6. The pattern assumed within the confines of liquid R'' is stable, and each body G'' is oriented in the same manner as the body G previously described. Each body G'' serves the same function as that of body G above described. The advantage of this form of the invention is that energizing waves from the radio frequency coil emanate parallel to the generator. Hence there is no alteration in the energizing field relative to the generator, for shell K'' and the balance of the system may rotate relative to the generator. This is not true in the embodiment of FIGS. 2–4.

A further modification of the invention is shown in FIG. 10 and is related to the embodiments shown in FIGS. 1A, 1D, 1E and 1F. Included is a cylindrical light housing 120 which has a source of light 122, such as an incandescent lamp or the like, mounted in the upper portion thereof. A cylindrical liquid container 124 is provided that has an inwardly extending annular flange 125 formed at the upper edge portion thereof, which supports a ring-shaped radio frequency coil 128 that is excited by a conventional oscillator circuit (not shown) connected to electrical conductors 130. A collimating lens 132 is transversely disposed within the confines of coil 128, as is the first polarizing medium 134 which is circular and adapted to polarize light passing therethrough into a beam in which the polarization is in a single plane. Medium 134 cooperates with the radio frequency coil 128 to seal the upper end of shell 124.

An ultrasonic sound generator 126 formed of a material having piezoelectric properties is also provided, and as may be seen in FIG. 10, is elongate and has a bore 129 extending through the length thereof. The central portion of generator 126 is preferably uniform in transverse cross section, and it tapers outwardly at the ends thereof into enlarged portions 130 and 132 respectively. End portions 130 and 132 are shown as being circular in transverse cross section, but may be square or other desired configuration.

As previously mentioned, generator 126 is fabricated from a material having piezoelectric qualities, and barium titanate is an example of one material suitable for this purpose. The lower end portion 132 is provided with a second polarizing medium 136 that is in sheet form, the upper surface of which is bonded or otherwise affixed to the lower surface of end portion 132. A circular photosensitive cell 138 is situated below generator 126, and is adapted to receive all light passing through the circumferentially extending ring-shaped surface confined by the outer circumferential edge of the enlarged end portion 132 and the outer circumferential edge of the second polarizing medium 136. To prevent the downward passage of light through bore 129, the central portion of the generator, or the enlarged end portions thereof to actuate the photosensitive cell 138, the interior upper light-sensitive area of this cell, generally designated by the numeral 140, is covered with a material 141 that is opaque to light. The plane of polarization effected by the first medium is normal relative to the plane of polarization effected by the second medium. A body 148 is provided that has the property of rotating the electric vectors of light passing transversely therethrough from the ring-shaped area 144 of the first medium to the ring-shaped area 146 of the second medium. The exterior longitudinal surface of body 148 is covered by a layer of metallic foil 150, and the interior longitudinal surface of this body is covered with a layer 152 of the same material. Layers 150 and 152 are not connected. An induction coil 154 is disposed within the confines of body 148. Although this body has been illustrated as being cylindrical, it is by no means limited to this particular configuration.

The system of FIG. 10 includes structural features of that form of the invention shown in FIG. 2, with light from the source 122 being polarized into a first plane and falling as a beam E' on the upper surface of body 148. After passing through body 148 the electrical vector thereof is rotated by the angle H', as shown in FIG. 10, prior to being directed onto the ring-shaped second polarizing surface 146, which surface polarizes the light in a plane normal to that in which it is polarized in passing through the first medium 134. Body 148 is suspended in a liquid 149 which may be of the same composition as the liquid R of FIGS. 2–4. In the latter case body 149 is initially oriented relative to body A so that no light passes to the photosensitive cell 138.

The ends of coil 154 are connected to the metallic layers 150 and 152. The exterior surface of the generator 126 is covered with a layer of metallic material 126a, and the surface defining bore 129 is also covered with a metallic layer 126a. Energization of the radio frequency coil 128 by the oscillator circuit (not shown) accomplished two purposes. First, inasmuch as generator 126 is formed of a piezoelectric material, it is energized by the high frequency electric current flowing in coil 128, and accordingly vibrates at a rate sufficient to emit ultrasonic wave energy into the liquid 149. This energy is of a magnitude to cause body 148 to assume a concentrically and longitudinally spaced relationship to generator 126, as shown.

The high frequency electric current passing through coil 128 also induces a high frequency current in coil 156 connected to the metallic layers 150 and 152. Coil 156 is, of course, mutually inductive with coil 128 whereby a voltage is induced in coil 156 which is applied to the equipotential defined by the metallic layers 150 and 152. This applied voltage leads to a stress-time function and imparts an angular momentum to body 148 to initially stabilize it against rotation in liquid 149 as shell 124, liquid 149 and generator 126 rotate relative thereto.

This embodiment of the invention operates substantially in the same manner as the system of FIGS. 2-4 but in common to the embodiment of FIG. 6 and described in conjunction therewith provides the operational advantage thereover characteristic of FIGS. 1A, 1D, 1E and 1F.

Having described the invention in connection with certain specific embodiments thereof, it is to be understood that further modifications may now suggest themselves to those skilled in the art and it is intended to cover such modifications as fall within the scope of the appended claims.

What is claimed is:

1. A sonic support system which comprises a container having a body of a compressible medium therein, source means for generating a symmetrical radially divergent ultrasonic field in said medium for establishing a time average force field therein, and means including a structure supported in said medium for free movement relative to said source means forming a barrier having opposing surface portions thereof in diametrically opposed zones facing said source means for modifying the time average force field, said force field being of magnitude sufficient to position said structure at an equilibrium position with said surfaces in zones of negative pressure gradients.

2. A sensing system which comprises an acoustic transmission medium in which density is a function of pressure, source means for generating a symmetrical radially divergent sound field in said medium having symmetry relative to a selected axis, means including a geometrical solid supported in said medium for free movement relative to said source means in said medium and having opposed surface portions facing said source means for modifying by interaction with said sound field the time average pressure gradient in said field, said force field being of magnitude sufficient normally to restrain said solid at a reference position both in inertial space and with respect to said medium with said surface portions in zones of negative pressure gradient, and means for sensing relative movement between said solid and said field.

3. A motion sensing system comprising a housing having an acoustic transmission medium confined therein and characterized by density thereof being dependent upon pressure, an element movable in said housing, transducer means disposed with opposed surfaces thereof confronting opposed surfaces of said element and secured to said housing for generating acoustic forces in said medium characterized by standing pressure wave patterns symmetrical to the axis of said housing, said force field being of magnitude sufficient to restrain said element at a reference position determined principally by said forces with said opposed surfaces of said element in zones of negative pressure gradient, and means for sensing movement of said housing relative to said element.

4. An accelerometer which comprises a cylindrical housing having a spherical acoustic radiator supported centrally therein and inundated by an acoustic transmitting medium characterized by pressure-dependent density, said spherical radiator being adapted upon energization to generate a spherical sound field in said medium, structure including a cylinder positioned coaxially in said housing and a central spherical shell which encompasses said spherical radiator, said structure being slightly buoyant in said medium and said structure being positionally responsive to the sound field from said radiator, a cylindrical acoustic radiator positioned inside each of the ends of said cylinder and adapted, upon energization, to establish cylindrical sound fields in the region of said ends of intensity substantially in excess of the intensity of said spherical sound field to constrain said structure with respect to components of acceleration normal to the axis of said housing, and means for sensing variations in the positional relationship between said structure and said housing.

5. The combination set forth in claim 4 in which opposite ends of said cylinder and confronting portions on the ends of said housing form elements of capacitors which vary in dependence upon accelerations along the axis of said housing.

6. An accelerometer which comprises a cylindrical housing having a spherical acoustic radiator supported centrally therein and inundated by an acoustic transmitting medium characterized by pressure-dependent density, said spherical radiator being adapted upon energization to generate a spherical sound field in said medium, buoyant structure including a cylinder positioned coaxially in said housing and a central spherical shell which encompasses said spherical radiator, said structure being positionally responsive to the sound field from said radiator, a cylindrical acoustic radiator positioned inside each of the ends of said cylinder and adapted upon energization to establish cylindrical sound fields in the region of said ends of intensity substantially in excess of said spherical sound field to constrain said structure with respect to components of acceleration normal to the axis of said housing, a variable capacitor having one element carried by said cylinder and the other element fixed to said housing for sensing variations in the position of said cylinder in said housing, and means connected to said capacitor for registering said variations.

7. A system for sensing deviation which comprises a cylindrical housing having an acoustic transmission medium confined therein which is characterized by density thereof being dependent upon pressure, a reference structure movable in said housing comprised of a cylinder having an internally supported spherical shell, transducer means disposed within said structure and mounted in said housing for generating three separate sound fields, the first of which is a spherically divergent field developing time average forces cooperating with the inner surface of said spherical shell to restrain said reference structure with relatively low forces at a reference position in said cylinder, the other two sound fields being cylindrically divergent and developing time average forces cooperating with oposed inner surfaces of the ends of said cylinder to restrain said cylinder with relatively high forces with respect to movement of said housing in directions perpendicular to the axis thereof, and means for sensing movement of said housing relative to said structure.

8. The combination set forth in claim 7 in which capacitive pickoff means are provided at the ends of said cylinder to sense accelerations of said housing along said axis thereof.

9. The combination set forth in claim 7 in which means are provided for sensing rotational movement of said housing relative to said structure.

10. A rotational deviation sensing system comprising a housing having an acoustic transmission medium confined therein which is characterized by the density thereof being dependent upon pressure, an element movable in said housing, transducer means disposed with said element and secured to said housing for generating acoustic forces in said medium which are characterized by time average force patterns symmetrical to an axis in said housing, said force patterns being of such magnitude as to restrain said element normally at a reference position determined principally by said force patterns with surfaces of said element facing said transducer means in zones of negative pressure gradient, and means for sensing rotation of said housing relative to said element.

11. A rotational deviation sensing system which comprises a housing having an acoustic transmission medium confined therein which is characterized by density thereof being dependent upon pressure, a buoyant body movably positioned within said housing, transducer means disposed with opposed surfaces thereof confronting opposed surfaces of said body and secured to said housing, means for energizing said transducer means to generate acoustic forces in said medium which are characterized by time average force patterns symmetrical to said transducer means, said force patterns being of such magnitude as to restrain said body normally at a reference position determined principally by said force patterns with said surfaces of said body in zones of negative pressure gradient, and means for sensing rotational movement of said housing relative to said body.

12. A method of detecting directional rotational deviation of a movable body about an elected axis thereof, comprising:
 (a) providing a source of light that remains in fixed position relative to said movable body during movement thereof;
 (b) polarizing at least a portion of said light at a first position relative to said movable body into a beam that extends along the length of said elected axis with said beam being polarized in a first plane;
 (c) polarizing said beam a second time and at a second position relative to said movable body and longitudinally spaced from said first position into light polarized in a second plane normal to said first plane;
 (d) disposing a light transmitting body capable of high frequency angular momentum when subjected to a wave-propagated energy field of high frequency in an initially oriented third position between said first and second positions prior to said movement of said movable body to have said beam pass therethrough, which light transmitting body has the property of rotating the electric vector of said beam prior to passage of said beam therefrom, with said light transmitting body when in said third position being so rotationally oriented relative to the directions of polarization occurring at said first and second positions that no light passes beyond said second position;
 (e) generating high frequency wave-propagated energy during any movement of said movable body;
 (f) directing said high frequency wave-propagated energy onto said light transmitting body to maintain same in said third position without rotation about said elected axis during any movement of said movable body; and
 (g) measuring the quantity of polarized light beyond said second position to determine the magnitude of said directional rotational deviation of said movable body about said elected axis.

13. A method as defined in claim 12 wherein said light transmitting body has piezoelectric properties, and said field of wave-propagated energy is ultrasonic sound energy.

14. A method as defined in claim 12 wherein said light transmitting body has piezoelectric properties and which includes the further steps of:
 (a) generating ultrasonic sound energy at a fixed position relative to said movable body;
 (b) generating a high frequency magnetic field at a fixed position relative to said movable body;
 (c) directing said ultrasonic sound energy onto said light transmitting body to cause same to assume said third position; and
 (d) directing said magnetic field onto said light transmitting body to prevent rotation thereof about said elected axis during any movement of said movable body.

15. A method as defined in claim 12 wherein said light transmitting body has piezoelectric properties and said method includes the further steps of:
 (a) disposing a confined quantity of optically inactive liquid between said first and second positions, which liquid is light-transmissive and of substantially the same density as said light transmitting body;
 (b) suspending said light transmitting body in said liquid;
 (c) generating wave-propagated energy at a fixed position relative to said movable body; and
 (d) directing said wave-propagated energy through said liquid to said light transmitting body to cause such angular momentum thereof that said light transmitting body remains suspended in said third position during any movement of said movable body and is non-rotative relative to said elected axis.

16. A method as defined in claim 12 wherein said wave-propagated energy is ultrasonic sound and which method includes the further steps of generating ultrasonic sound energy at a plurality of spaced points that are in fixed positions relative to said movable body; and directing said ultrasonic sound energy as beams of energy which impinge on said light transmitting body to induce said angular momentum.

17. A method of detecting both directional and rotational deviation of a movable body about an elected axis and lateral acceleration of said movable body relative to said elected axis, comprising:
 (a) establishing a beam of light in a fixed path relative to said movable body during any movement thereof;
 (b) polarizing said beam at a first position relative to said movable body in a first plane;
 (c) polarizing said beam a second time at a second position relative to said movable body and longitudinally spaced from said first position in a second plane normal to said first plane;
 (d) disposing a light transmitting body capable of high frequency angular momentum when subjected to a wave-propagated energy field of high frequency in an initially oriented third position between said first and second positions, said light transmitting body having the property of rotating the electric vector of said first beam prior to passage of said first beam therefrom, with said light transmitting body when in said third position being so rotationally oriented relative to the directions of polarization occurring at said first and second positions that no light passes beyond said second position;
 (e) generating high frequency wave-propagated energy during the movement of said movable body;
 (f) directing said high frequency wave-propagated energy onto said light transmitting body to maintain same in said third position without rotation about said elected axis during any movement of said movable body;
 (g) measuring the quantity of light in said beam beyond said second position to determine the magnitude of said directional rotational deviation of said movable body about said elected axis; and
 (h) measuring the lateral displacement of said light transmitting body relative to said elected axis to detect acceleration of said movable body.

18. A method of detecting directional rotational deviation of a movable body about an elected axis thereof, comprising:
  (a) generating a beam of light and directing the same along said elected axis;
  (b) polarizing said light in a first direction at a first position on said beam;
  (c) polarizing said light in a second direction at a second position on said beam in a direction normal to said first direction;
  (d) disposing a light-transmitting body between said first and second positions and in coaxial alignment therewith, said body having the property of rotating the electrical vector of said light as it passes therethrough;
  (e) holding said light-transmitting body in suspension between said first and second positions and in a fixed non-rotating position on said elected axis relative to said movable body;
  (f) rotating said light-transmitting body about said elected axis prior to movement of said movable body to a position where no light from said beam passes beyond said second position; and
  (g) measuring the quantity of said light passing beyond said second position as said movable body moves, to detect the degree of rotational deviation of said movable body about said elected axis.

19. A method as defined in claim 18 which includes the further step of subjecting said body to ultrasonic sound energy to cause said light-transmitting body to be subjected to high frequency angular momentum, the steady component of which holds said light-transmitting body at said fixed non-rotating position when said movable body moves in inertial space.

20. Apparatus for use in detecting directional rotational deviation of a movable body about an elected axis comprising:
  (a) a first polarizing medium oriented at a first position on said movable body for polarizing in a first plane light passing therethrough,
  (b) a second polarizing medium oriented at a second position on said body for receiving light from said first medium and for polarizing in a second plane normal to said first plane light passing therethrough,
  (c) a light source mounted on said body to supply light to said first medium,
  (d) a light transmitting body having piezoelectric properties and capable of rotating the electric vector of polarized light disposed in liquid between said first and second positions,
  (e) a source of acoustic waves coupled to said liquid to impart angular momentum to said light transmitting body to hold said body in an orientation relative to said movable body at which light is transmitted through said second polarizing medium at a reference level, and
  (f) means for sensing variations in the light passing through said second polarizing medium to indicate the rotational deviation of said movable body relative to said axis.

21. Apparatus for use in detecting directional rotational deviation of a movable body about an elected axis comprising:
  (a) a first polarizing medium oriented at a first position on said movable body for polarizing in a first plane light passing therethrough,
  (b) a second polarizing medium oriented at a second position on said body for receiving light from said first medium and for polarizing in a second plane normal to said first plane light passing therethrough,
  (c) a quantity of optically inactive light transmissive liquid,
  (d) means to confine said liquid between said first and second positions,
  (e) a light source mounted on said body to supply light to said first medium,
  (f) a light transmitting body in said liquid capable of rotating the electric vector of polarized light suspended between said first and second positions,
  (g) a source of wave propagated energy coupled to said liquid to impart angular momentum to said light transmitting body to hold the same in an orientation relative to said movable body at which light is transmitted through said second polarizing medium at a reference level, and
  (h) means for sensing variations in the light passing through said second polarizing medium to indicate rotational deviation of said movable body relative to said axis.

22. Apparatus for use in detecting directional rotational deviation of a movable body about an elected axis comprising:
  (a) a first polarizing medium oriented at a first position on said movable body for polarizing in a first plane light passing therethrough,
  (b) a second polarizing medium oriented at a second position on said body for receiving light from said first medium and for polarizing in a second plane normal to said first plane light passing therethrough,
  (c) a quantity of optically inactive light transmissive liquid,
  (d) means to confine said liquid between said first and second positions,
  (e) a light source mounted on said body to supply light to said first medium,
  (f) a light transmitting body having piezoelectric properties and capable of rotating the electric vector of polarized light disposed in said liquid between said first and second positions,
  (g) a source of acoustic waves coupled to said liquid to impart angular momentum to said light transmitting body to hold said body in an orientation relative to said movable body at which light is transmitted through said second polarizing medium at a reference level, and
  (h) means for sensing variations in the light passing through said second polarizing medium to indicate the rotational deviation of said movable body relative to said axis.

23. Apparatus as defined in claim 21 that serves as an accelerometer wherein said liquid is of density such that said light transmitting body is buoyant therein.

24. A sonic support system which comprises a container having a body of a compressible medium therein, source means for generating an ultrasonic field in said medium in which the energy density changes with distance from said source means for establishing a time average force field therein, and means including a structure supported in said medium for free movement relative to said source means forming a barrier having opposing surface portions thereof in diametrically opposed zones facing said source means for modifying the time average force field, said force field being of magnitude sufficient to position said structure at an equilibrium position with said surfaces in zones of negative pressure gradient.

References Cited in the file of this patent
UNITED STATES PATENTS 2,434,255  Bond et al. _____ Jan. 13, 1948
2,984,111  Kritz _____ May 16, 1961

OTHER REFERENCES

Wood: A Textbook of Sound, The Macmillan Co., New York, 1955 (third edition), pages 581 to 583 inclusive relied upon.

UNITED STATES PATENT OFFICE
CERTIFICATE OF CORRECTION

Patent No. 3,164,022                                    January 5, 1965

Donald Luther Ensley

It is hereby certified that error appears in the above numbered patent requiring correction and that the said Letters Patent should read as corrected below.

Column 5, line 1, for "centimeter" read -- centimeters --; column 6, line 75, strike out "and 240"; column 12, line 37, for "for" read -- of --; column 16, lines 25 and 26, for "disclosed" read -- disposed --; column 18, lines 29 and 30, for "photosentitive" read -- photosensitive --; column 20, line 57, for "oposed" read -- opposed --.

Signed and sealed this 13th day of July 1965.

(SEAL)
Attest:

ERNEST W. SWIDER                                    EDWARD J. BRENNER
Attesting Officer                                   Commissioner of Patents